United States Patent [19]

Wilhelm, Jr.

[11] Patent Number: 5,503,866
[45] Date of Patent: Apr. 2, 1996

[54] RELEASING COMPOSITIONS FOR FOOD CONTACT SURFACES

[75] Inventor: Robert O. Wilhelm, Jr., Munhall, Pa.

[73] Assignee: Mallet and Company, Inc., Carnegie, Pa.

[21] Appl. No.: 373,546

[22] Filed: Jan. 17, 1995

[51] Int. Cl.$^6$ .................................................. A23D 9/06
[52] U.S. Cl. .................... 426/609; 426/604; 426/601; 106/243
[58] Field of Search ................................ 426/609, 601, 426/604; 106/244

[56] References Cited

U.S. PATENT DOCUMENTS

| | | |
|---|---|---|
| 2,212,020 | 8/1940 | Hendrey . |
| 2,222,487 | 11/1940 | Oosterhout . |
| 2,244,416 | 6/1941 | Ashburn . |
| 2,257,601 | 9/1941 | Hall . |
| 2,295,179 | 9/1942 | Loane . |
| 2,295,192 | 9/1942 | Arveson . |
| 2,718,502 | 9/1955 | Francis . |
| 3,661,605 | 5/1972 | Ruben ............................ 106/244 |
| 3,896,975 | 7/1975 | Follmer ............................ 106/244 |
| 3,906,117 | 9/1975 | Gawrilow . |
| 4,062,785 | 12/1977 | Nibert . |
| 4,073,411 | 2/1978 | Doumani . |
| 4,073,412 | 2/1978 | Doumani ............................ 106/244 |
| 4,127,419 | 11/1978 | Szuhaj . |
| 4,142,003 | 2/1979 | Sejpal ............................ 426/609 |
| 4,155,770 | 5/1979 | Doumani . |
| 4,163,676 | 8/1979 | Konysbacker ............................ 426/609 |
| 4,188,412 | 2/1980 | Sejpal ............................ 426/609 |
| 4,339,465 | 7/1982 | Strouss ............................ 426/609 |
| 4,371,451 | 2/1983 | Scotti . |
| 4,439,342 | 3/1984 | Albanese ............................ 106/243 |
| 4,524,085 | 6/1985 | Purves ............................ 426/609 |
| 4,528,201 | 7/1995 | Purves ............................ 426/609 |
| 4,547,388 | 10/1985 | Strouss ............................ 426/609 |
| 4,753,742 | 6/1988 | Wilhelm . |
| 4,835,002 | 5/1989 | Wolf . |
| 4,966,779 | 10/1990 | Kirk . |
| 5,296,021 | 3/1994 | Clapp ............................ 426/602 |
| 5,431,719 | 6/1995 | Clapp ............................ 106/243 |

FOREIGN PATENT DOCUMENTS 61-141842  6/1986  Japan .

OTHER PUBLICATIONS

Fennema 1985 Food Chemistry, second edition pp. 169–175 Marcel Dekker Inc. New York.

*Primary Examiner*—Carolyn Paden
*Attorney, Agent, or Firm*—Daniel Patch

[57] ABSTRACT

A lecithin based release composition for food contact surfaces is disclosed to contain 8–100 parts by weight lecithin, 5–100 parts by weight edible oil, 0.1–100 parts by weight emulsifier and 30–100 parts by weight water.

19 Claims, No Drawings

RELEASING COMPOSITIONS FOR FOOD CONTACT SURFACES

BACKGROUND OF THE INVENTION

The present invention relates to lecithin based compositions which are useful for coating food contact surfaces to prevent sticking and to facilitate the releasing of food products. These compositions are suitable for mechanical spraying applications, and manual applications such as brushing or rolling onto food contact surfaces without the need for chemical based propellants, alcohols or hydrocarbon solvents.

DESCRIPTION OF PRIOR ART

It has been well known that commercial food grade lecithin, both natural and modified types, can be utilized in the baking industry and the snack food industry, as well as for other food processing industries, as an effective food contact surface release agent. The physical properties of lecithin, however, primarily its high viscosity and poor flow characteristics, among other considerations such as economics, have had a significant negative impact in the manner in which it can be used in both aerosol and non-aerosol applications.

Prior lecithin based compositions have taken various forms aimed at being acceptable for use in food applications but yet remaining effective as food release agents. Such compositions have included the use of various combinations of edible oils, emulsifiers, water, chemical based propellants, solvents, etc. designed to overcome the inherent physical limitations of lecithin but allow utilization of its functionality as a food contact surface anti-sticking releasing agent, hereinafter on some occasions referred to as releasing or release agent, composition or formulation.

For many years, lecithin was simply combined with edible oils and/or white mineral oils, typically from 1–30 percent by weight, with sufficient heat and agitation in an attempt to produce stable, homogenous, and very fluid release compositions. These compositions were generally supplemented with other additives, such antifoaming agents, emulsifiers and antioxidants to further enhance functionality. The referenced type of compositions have been relatively low in viscosity and were capable of being mechanically sprayed or mixed with chemical based propellants for adequate aerosol application properties. These prior compositions have proved to a certain degree satisfactory for many food surface applications such as bakery pans, confectionery surfaces, various consumer uses, etc. They, however, have some serious limitations such as reduced smoke points in comparison with edible oils, storage stability concerns, the use of additives and economic considerations which affect their usefulness.

In addition to the use of edible oils, water has been utilized to help form usable lecithin based release compositions. These compositions, however, have required the use of other additives such as solvents, alcohols, chemical based propellants and emulsifiers to enhance application as well as functional properties. Some examples of these above noted lecithin based compositions which utilize water can be found in the following U.S. patents:

U.S. Pat. No. 4,073,411 to Doumani, dated Feb. 14, 1978, discloses the formation of lecithin based compositions utilizing water in combination with hydrocarbon solvents, polyols, emulsifiers, etc. to formulate release agents.

In U.S. Pat. No. 4,371,451 to Scotti, et al., dated Feb. 1, 1983, there is disclosed a lecithin based surface release composition utilizing water with dimethyether as the propellant with or without the use of ethanol in an attempt to permit an adequate dispersion of the lecithin in the combination. These compositions were designed to provide a lecithin based release agent with desired flow properties for proper application to contact surfaces.

U.S. Pat. No. 5,296,021 to Clapp, et al., dated Mar. 22, 1994, teaches that compositions with various commercial grade lecithins, natural and modified, can be designed with the use of edible oils, emulsifying agents, water and a gaseous propellant to form a water in oil emulsion which is suitable for aerosol application. The emulsifying agents include various phosphates and chlorides coupled with the propellant.

In each of the compositions of the noted patent specifications, appreciable percentages of water are used. One reason for employing water in past surface release compositions was its application benefits. As pointed out in U.S. Pat. No. 4,127,419, to Szuhaj, et al., dated Nov. 28,1978, which relates to a lecithin based edible oil pan release agent, water is also highly desirable from a cost standpoint, albeit its use involves the acceptance of certain drawbacks. lecithin based release compositions which utilize water to form an emulsion suitable for release applications have had to be concerned with such things as product separation, product spoilage, product texture and viscosity and ability of the product to be in a form suitable for mechanical spraying and other applications. In addition, the use of chemical based propellants, alcohols and/or hydrocarbon solvents creates a potential flammability concern to the composition.

The above represent examples of numerous prior mechanisms which attempt to utilize the properties of lecithin in compositions designed for food or other contact surfaces to prevent sticking and facilitate releasing. Nevertheless, as noted above, even though some of these compositions have found use in the related industries their use has been limited for the reasons given.

BRIEF SUMMARY OF THE INVENTION

The present invention has for one of its objects providing releasing compositions for food contact surfaces which allow the use of relatively high concentrations of lecithin in a water based emulsion which realizes the advantages of lecithin in a release composition and yields significant functionality in such applications without being subject to their typical well disadvantages.

The present invention also provides lecithin based releasing compositions utilizing water to form emulsions which are readily usable without the use of chemical based propellants, alcohols or hydrocarbon solvents.

The present invention provides newly found releasing compositions characterized by being readily applied and comprising in emulsion form only of lecithin, water, edible oil and an emulsifying agent having relatively strong hydrophilic tendencies, in which the composition may yet have a relatively low viscosity.

The present invention in addition provides an improved novel discovered formulation of a readily sprayable releasing emulsion composition comprising the components of lecithin, water, edible oil and a surface active emulsifying agent with a relatively high HLB number and capable of providing a low to moderately high viscosity without the use of any other components to accomplish these objectives.

The improved compositions are shelf stable and can have a viscosity range from approximately 80 to 10,000 cps @80° F., and can be applied to food contact surfaces using a variety of mechanisms, including mechanical spraying to yield superior releasing properties. This technology provides the capability to produce release compositions with a wide viscosity range to cover many application requirements by altering the lecithin concentration or other components, and yet still maintain its integrity and overall functionality. These compositions are designed to utilize the highly desirable functionality exhibited by lecithin while minimizing its cumbersome handling characteristics while permitting the use of a high percentage of water with its inherent economic and application benefits.

Generally, it was found that when employing the use of relatively low concentrations of an emulsifier system with strong hydrophilic tendencies (i.e. having a relatively high HLB number) in conjunction with lecithin, this system can be combined with edible oils and a high percentage of water to form very stable, controlled viscosity emulsions which are exceptionally shelf stable, have improved functional properties and are economical to use.

Another object of the invention is to provide lecithin based releasing compositions that allow the compositions to be formed as base compositions without water being added initially suitable for shipment and as post compositions to which the water is added at the location of use and the compositions are formed into emulsions ready to use.

One example of the improved compositions consist approximately in parts by weight of soybean oil—15.38, lecithin—14.62, polysorbate 60—0.77, water—68.03, sodium propionate—1.00, potassium sorbate—0.20, total 100.00 having an approximate viscosity of 500 cps/78° F. In the case of a produced based composition, the improved base composition would contain all of the listed components in homogenous form except for water.

In testing the emulsion stability during storage over several months at ambient temperature and at a constant temperature of 103° F., very little separation or emulsion instability was noted. It was observed that the limiting factor for shelf life most probably would be the development of rancidity rather than a breakdown of the emulsion itself, provided that proper storage conditions are met. The use of very stable oils, such as peanut oil, was found to have a helpful impact in this area. In addition, the development of mold and other bacteria would also be a concern, but it was found that the use of mold inhibiting agents such as sodium propionate and potassium sorbate greatly minimized this potential area of concern.

DETAILED DESCRIPTION OF INVENTION

The basic aim of the invention is to provide releasing compositions for food contact surfaces in the form of emulsions having relatively high concentrations of lecithin and water, which do not require the use of solvents, chemical based propellants or alcohols and which are suitable for mechanical spraying and manual applications. These compositions, accordingly formed, are conducive, by varying the amounts and types of ingredients used, to being able to be tailored to meet specific performance requirements and employ additives to take care of particular concerns such as storage life conditions and conditions of use.

In this regard, it has been found that when employing the use of an emulsifier system with strong hydrophilic tendencies (i.e. having a high HLB number, i.e. greater than 7) in conjunction with lecithin, very stable, controlled viscosity emulsions with edible oils and water can be formed. Table #1 illustrates some of these formulations and results when using polysorbate 60 (polyoxyethylene sorbitan monostearate) and ethoxylated mono & diglycerides—HLB numbers approximately 15 and 13 respectfully. Both of these surfactants are commercially available such as the products sold under the trademarks "GLYCOSPERSE" and "ALDOSPERSE" family of products from the Lonza Company.

The term "HLB number" as used herein refers to the Hydrophile-Lipophile Balance which is an index to emulsifiers developed by Atlas Chemical Industries Inc. The HLB number for a nonionic emulsifier is an indication of the relative hydrophilic tendencies of the nonionic emulsifier to its lipophilic tendencies. The higher the HLB number, the greater the affinity for water, which is a feature relied upon in the formulation of the improved composition. HLB numbers of 4 to 7 are considered low in U.S. Pat. No. 3,896,975, to Follmer, dated Jul. 29, 1975 which relates to an aerosol-lecithin aqueous emulsion.

The desired physical attributes of the improved compositions can be controlled by varying the amount of lecithin, edible oils and/or water to produce stable emulsions within certain parameters and with adjustments in the quantities of the emulsifier system as illustrated in table #1. These results can be achieved without the use of any chemical based propellants, alcohols or hydrocarbon solvents. Nevertheless, these compositions can be designed to meet diverse applications to cover a wide variety of types of food contact surfaces, including bakery pans & sheets, conveyors and candy molds.

The method used to incorporate the components in order to form a smooth stable emulsion is important. The lecithin and emulsifier system are first heated and mixed. The edible oil component is then added and the whole mass agitated until homogenous. The water is then incorporated with enough agitation to create the emulsion. Also, the temperature range during processing is very significant and will have to be maintained based on the type of edible oils used and the emulsifier system utilized. These emulsions will generally not form properly if other methods are used whereby the water is incorporated in the first stage of the process. These control factors would become evident upon the processing of the finished emulsion.

As noted above, the novel formulation allows water to be incorporated in the final stage of the process. Thus, the final step in the processing may be delayed until the finished emulsion is actually needed. This can be economically advantageous in that a base can be formulated with all of the other components and transported to another location before the water is added to form the finished emulsion. Hence, this means, along with other advantages including handling and storage, that the added expense of shipping water to the end user's locations can be eliminated and an emulsion can be produced at the location where it will ultimately be used and having all of the advantages as when water is added prior to shipment. This, of course, is provided that the processing equipment and methodology for incorporation follows correct industrial practices.

TABLE #1

| | Example/Embodiment | | | | | | |
|---|---|---|---|---|---|---|---|
| | #1 | #2 | #3 | #4 | #5 | #6 | #7 |
| Soybean Oil | 15.38 | 21.00 | 17.27 | 17.27 | 40.24 | 43.12 | 30.12 |
| Lecithin | 14.62 | 20.00 | 17.27 | 17.27 | 11.76 | 11.76 | 11.76 |
| Polysorbate 60 | 0.77 | 1.00 | 1.00 | — | 2.00 | 0.50 | 0.50 |
| Ethoxylated Mono + Diglycerides | — | — | — | 1.00 | 2.00 | 0.62 | 0.62 |
| Water | 68.03 | 56.80 | 63.26 | 63.26 | 42.80 | 42.80 | 42.80 |
| Sodium Propionate | 1.00 | 1.00 | 1.00 | 1.00 | 1.00 | 1.00 | 1.00 |
| Potassium Sorbate | 0.20 | 0.20 | 0.20 | 0.20 | 0.20 | 0.20 | 0.20 |
| White Mineral Oil | — | — | — | — | — | — | 13.00 |
| | 100.00 | 100.00 | 100.00 | 100.00 | 100.00 | 100.00 | 100.00 |
| Viscosity @ 80° F. | 500 cps | 4500 cps | 1800 cps | 2000 cps | 800 cps | 1500 cps | 1600 cps |
| Emulsion Stability | Good | Good | Good | Good | Good | Good | Good |
| Emulsion Texture | Smooth | Smooth | Smooth | Smooth | Smooth | Smooth | Smooth |
| Releasing Characteristics | Excellent | Excellent | Excellent | Excellent | Excellent | Excellent | Excellent |

With reference to Table #1, it will be appreciated that the formulation of soybean oil, lecithin, polysorbate 60, and/or Ethoxylated Mono+Diglycerides (these being surface active emulsifying agents) and water is responsible for the indicated results, in which sodium propionate and potassium sorbate are employed to take care of storage conditions and/or temperature conditions. In addition to the compositions formulated in Table #1, compositions with as little as 8 percent lecithin or 10 percent edible oil can be formulated to meet various needs and still achieve satisfactory emulsion stability. Usually, not less than 30 percent water has been found to produce emulsions that were satisfactory in the parameters previously indicated. It should be noted, however, that one of the advantages of the improved compositions is that very stable emulsions can be produced with a very wide viscosity range by only altering the given components without the need for any other additives as illustrated in Table #1. The approximate ranges of the four elements by 100 parts by weight are as follows: soybean oil—10 to 60, lecithin—8 to 30, polysorbate 60—0.10 to 10.0, water—30 to 75. In addition, if white mineral oil is used, —5 to 60 and where ethoxylated mono and diglycerides is to be added—0.10 to 10.0.

From Table #1, it can be seen that the concentration of lecithin has a beneficial impact on the finished composition. In all cases illustrated, however, there is sufficient concentration to provide desirable releasing for most food contact surfaces. More importantly, these compositions are readily sprayable and can be applied via a host of different mechanisms, including mechanical systems, and all of the above compositions yielded excellent releasing results when tested with baked goods such as bread and cake and molds for confectionery products. It should also be noted that other changes such as type of edible oil used, such as Table #1, example #7, and type of emulsifier system used will affect the finished composition as indicated, in part, by the differences in the viscosity readings.

The emulsion stability was monitored during storage over several months both at ambient temperature and at a constant temperature of 103° F. In these tests, very little separation or emulsion instability was noted. It was found that the limiting factor for shelf life most probably would be the development of rancidity rather than a breakdown of the emulsion itself if the compositions were properly stored. The use of very stable oils and type of lecithin utilized would have an impact in this area. For example, the use of partially hydrogenated, winterized soybean oil and a heat resistant lecithin was found to perform satisfactory. A similar result should be obtainable with the use of oils that are fractionated or otherwise modified. In addition, the development of mold and bacteria would also be a concern, but it was found that the use of mold inhibiting agents, such as sodium propionate and potassium sorbate, successfully addresses this area of concern.

Some of the other edible oils tested were canola oil, corn oil, peanut oil, partially hydrogenated soybean oil (110 IV) and coconut oil. The results are shown in Table #2.

TABLE #2

| | #1 | #2 | #3 | #4 | #5 |
|---|---|---|---|---|---|
| Canola Oil | 17.27 | — | — | — | — |
| Partially Hydrogenated Soybean Oil | — | 17.27 | — | — | 9.27 |
| Corn Oil | — | — | 17.27 | — | — |
| Coconut Oil | — | — | — | — | 8.00 |
| Peanut Oil | — | — | — | 17.27 | — |
| Lecithin | 17.27 | 17.27 | 17.27 | 17.27 | 17.27 |
| Polysorbate 60 | 1.00 | 1.00 | 1.00 | 1.00 | 1.00 |
| Water | 63.26 | 63.26 | 63.26 | 63.26 | 63.26 |
| Potassium Sorbate | 0.20 | 0.20 | 0.20 | 0.20 | 0.20 |
| Sodium Propionate | 1.00 | 1.00 | 1.00 | 1.00 | 1.00 |
| | 100.00 | 100.00 | 100.00 | 100.00 | 100.00 |

TABLE #2-continued

|  | #1 | #2 | #3 | #4 | #5 |
|---|---|---|---|---|---|
| Viscosity 80° F. | 2500 cps | 2100 cps | 5500 cps | 3250 cps | 80 cps |
| Emulsion Stability | Good | Good | Good | Good | Poor |
| Emulsion Texture | Smooth | Smooth | Smooth | Smooth | Grainy |
| Releasing Characteristics | Excellent | Excellent | Excellent | Excellent | — |

The ingredients identified in Tables #1 and #2 are all commercially available from a number of sources and in several different types and some in dry and liquid forms. Table #2 illustrates various compositions using several available edible oils. In a preferred form, commercially available edible fatty acid based surfactants are employed such as from the trademarks "GLYCOSPERSE" and "ALDOSPERSE" family of products available from the Lonza Company. Further, the desired physical attributes of these compositions can be controlled by varying the amount of lecithin, amount and type of edible oil and/or the percentage of water to produce stable emulsions within certain parameters and with adjustments in the quantities of the emulsifier system. These results can be achieved without the use of any chemical based propellants, alcohols or hydrocarbon solvents. Nevertheless, the compositions can be designed to meet diverse applications to cover many types of food contact surfaces including bakery pans and sheets, conveyors and candy molds.

In the improved compositions, the concentration of lecithin has a favorable impact on the finished composition; it being found that a sufficient concentration can be employed to provide desired releasing for the food contact surfaces tested. These compositions are readily sprayable and can be applied via a host of different mechanisms, and the compositions yielded beneficial releasing results with baked goods, such as bread and cake and molds for confectionery products. These various compositions as shown in Table #1 and Table #2 were tested using typical commercial white pan bread formulations and commercial snack cake formulations in a variety of pan configurations. It should also be noted that other changes such as type of edible oil used, concentration of water, level and type of emulsifier(s) used, such as nonionic, will affect the finished composition so that a given composition can be tailored for a specific application condition.

One of the features of the improved compositions is that the compositions are very adaptable and can be made up by using many of the available edible oils. Using the same emulsifier system and identical concentration of lecithin and water, similar but yet unique compositions were produced, each with its own useful characteristics. Moreover, the types of oils used will have beneficial effects in some applications where high heat on other factors affect functionality.

With reference and in addition to those identified in Table #2, the types of lecithin used, both modified and natural, preferable in liquid form, yielded emulsions of varying properties all suitable for releasing food from contact surfaces. One example of a commercially available lecithin is sold under the trademark "YELKIN" SS supplied by the ADM Co. The type of emulsion necessary can be designed by altering one or more of the components to meet a given requirement. For example, if very low viscosities are desired, this can be satisfied by decreasing the amount of lecithin and increasing the concentration of water with given parameters as noted in formulation #5, Table #1. On the other hand, a relatively high viscosity can be produced as indicated in formulation #2, Table #1.

There are several advantages that the improved lecithin based compositions have over past emulsion types or oil based compositions as release agents for food contact surfaces. One, the improved compositions are exceptionally stable and can withstand elevated storage temperatures without exhibiting separation for several months. Secondly, the viscosity of the improved emulsions can be controlled via formulation to meet many application requirements. Thirdly, the release characteristics of the improved compositions are beneficial as a high concentration of lecithin can be accommodated without creating the typical application problems. Fourthly, the improved compositions are economically much more cost effective than conventional products for most food contact surface applications because they do not entail the use of hydrocarbon solvents, alcohols or chemical based propellants and yet permit a high percentage of water to be used. Lastly, whereas previous compositions employing lecithin and water which have used such components as hydrocarbon solvents, chemical based propellants and/or alcohols, the improved compositions do not which decreases the potential safety concerns utilizing such materials when exposed to high heat or other similar applications.

In accordance with the provisions of the patent statutes, I have explained my invention in terms of its preferred embodiment, however, it will be readily understood by those skilled in the art to which the invention pertains that it may be practiced otherwise than illustrated and described.

I claim:

1. A lecithin based release composition for food contact surfaces in the form of an emulsion comprising the following components: lecithin, edible oil, emulsifier and water, said lecithin being in amounts at least 8 parts per 100 parts by weight, said edible oil being in amounts at least 5 parts per 100 parts by weight, said emulsifier being in amounts at least 0.1 parts per 100 parts by weight of an emulsifier with strong hydrophilic tendencies, said water being in amounts at least 30 parts per 100 parts by weight, and no more than 75 parts per 100 parts by weight, and wherein said lecithin is uniformly dispersed to form a relatively stable emulsion with said water and said emulsion being able to be produced with a substantially wide viscosity range without the use of chemical based propellants, alcohols or hydrocarbon solvents.

2. A lecithin based release composition according to claim 1, wherein said viscosity range falls within 80 to 10,000 cps at 80° F. and said lecithin is a food grade lecithin.

3. A lecithin based release composition according to claim 1, wherein said lecithin is in amounts between 8 to 30 parts per 100 parts by weight, said edible oil is in amounts between 5 to 60 parts per 100 parts by weight, and said emulsifier is in amounts between 0.1 to 10 parts by weight.

4. A lecithin based release composition according to claim 1, wherein said composition is free of solvents, alcohols or chemical based propellants, and said emulsifier includes a nonionic emulsifier and said lecithin is in the form of a food grade liquid lecithin.

5. A lecithin based release composition according to claim 1, wherein said emulsifier is comprised of a nonionic emulsifier with an HLB number greater than 7.

6. A lecithin based release composition according to claim 1, wherein said edible oil comprises one or more of the following: soybean oil, corn oil, cottonseed oil, peanut oil, safflower oil, sunflower oil, palm oil, coconut oil, rice bran oil, canola oil and white mineral oil.

7. A lecithin based release composition according to claim 1, wherein said edible oil comprises one or more of the following oils: soybean oil, corn oil, cottonseed oil, peanut oil, safflower oil, sunflower oil, palm oil, coconut oil, rice bran oil, canola oil and white mineral oil, all of which have been at least partially hydrogenated, fractionated, or otherwise modified.

8. A lecithin based release composition according to claim 1, wherein said emulsifier comprises a nonionic emulsifier with an HLB number greater than 7, and wherein said oil comprises one or more of the following: soybean oil, corn oil, cottonseed oil, peanut oil, safflower oil, sunflower oil, palm oil, coconut oil, rice bran oil, canola oil and white mineral oil.

9. A lecithin based release composition according to claim 1, wherein said emulsifier comprises a nonionic emulsifier with an HLB number greater than 7, and wherein said edible oil comprises one or more of the following oils: soybean oil, corn oil, cottonseed oil, peanut oil, safflower oil, sunflower oil, palm oil, coconut oil, rice bran oil, canola oil and white mineral oil, all of which have been partially hydrogenated, fractionated, or otherwise modified.

10. A lecithin based release composition according to claim 1, wherein said lecithin comprises modified lecithins.

11. A lecithin based release composition according to claim 1, wherein said emulsifier comprises a nonionic emulsifier with an HLB number greater than 7, and wherein said lecithin comprises modified lecithins.

12. A lecithin based release composition according to claim 1, which includes propionates, sorbates, or other inhibitors to prevent mold and/or bacterial growth.

13. A lecithin based release composition according to claim 1, wherein said emulsifier comprises a nonionic emulsifier with an HLB number greater than 7, and wherein composition includes propionates, sorbates, or other inhibitors to prevent mold and/or bacterial growth.

14. A lecithin based release composition according to claim 1, wherein said lecithin comprises modified lecithins, and wherein said composition includes propionates, sorbates or other inhibitors to prevent mold and/or bacterial growth.

15. A lecithin based release composition for food contact surfaces comprising a base composition and a post base composition, said base composition comprising of lecithin, edible oil and emulsifier, said lecithin being in amounts at least 8 parts per 100 parts by weight, said emulsifier being in amounts at least 0.1 parts per 100 parts by weight and having a strong hydrophilic tendency, and said base composition being in the form of a homogeneous mixture suitable for shipment to a user of the release composition, said post base composition comprising said base composition and water in emulsion form, in which said water is in amounts at least 30 parts per 100 parts by weight and no more than 75 parts per 100 parts by weight.

16. A lecithin based release composition according to claim 15, wherein said release composition is free of solvents, alcohols or chemical based propellants, and said emulsifier is nonionic and said lecithin is in the form of a food grade liquid lecithin.

17. A lecithin based release composition according to claim 16, wherein said lecithin is in amounts between 8 to 30 parts per 100 parts by weight, said oil being in amounts between 5 to 60 parts per 100 parts by weight, and said emulsifier being in amounts between 0.1 to 10 parts per 100 parts by weight.

18. A lecithin based release composition for food contact surfaces adapted for subsequent mixture with water to form an emulsion, said composition comprising of lecithin, edible oil and an emulsifier, said lecithin being in amounts at least 8 parts per 100 parts by weight, said edible oil being in amounts at least 5 parts per 100 parts by weight, and said emulsifier being in amounts at least 0.1 parts per 100 parts by weight and having a strong hydrophilic tendency.

said compositions being in the form of a homogenous mixture suitable for shipment for use by a user of the release composition after the addition of a desirable amount of water to form an emulsion, and wherein said emulsion is relatively stable with said water and being able to be produced with a substantially wide viscosity range without the use of chemical based propellants, alcohols or hydrocarbon solvents.

19. A lecithin based release composition according to claim 18, wherein said lecithin being in an amount between 8 to 30 parts per 100 parts by weight, said edible oil being in an amount between 5 to 60 parts per 100 parts by weight, and said emulsifier being in an amount between 0.1 to 10 parts per 100 parts by weight.

\* \* \* \* \*